United States Patent [19]

Linden

[11] 3,948,101
[45] Apr. 6, 1976

[54] BRACE ARRANGEMENT FOR A THERMOMETER

[76] Inventor: Ulf Linden, Hornarydsvagen 6, S-331 00 Varnamo, Sweden

[22] Filed: Mar. 21, 1974

[21] Appl. No.: 453,482

[30] Foreign Application Priority Data
Mar. 27, 1973   Sweden.............................. 7304265

[52] U.S. Cl. .................................. 73/376; 248/62
[51] Int. Cl.² .......................................... G01K 01/14
[58] Field of Search ........ 73/374, 378, 376; 248/62, 248/27; 85/80

[56] References Cited
UNITED STATES PATENTS

| | | | |
|---|---|---|---|
| 577,016 | 2/1897 | Fairchild | 73/374 |
| 1,462,797 | 7/1923 | Milker et al. | 73/378 |
| 1,942,506 | 1/1934 | Bolton | 73/376 |
| 2,012,741 | 8/1935 | Brown | 73/378 |
| 2,243,326 | 5/1941 | Bolton | 73/376 |
| 2,243,356 | 5/1941 | Olson | 73/378 X |
| 2,321,181 | 6/1943 | Brown | 73/376 |
| 2,556,862 | 6/1951 | Wappner | 73/376 |
| 3,177,717 | 4/1965 | Oveson | 73/374 X |
| 3,532,311 | 10/1970 | Havener | 248/62 |
| 3,722,037 | 3/1973 | Jaeger | 85/80 |

*Primary Examiner*—Richard C. Queisser
*Assistant Examiner*—Daniel M. Yasich
*Attorney, Agent, or Firm*—Albert L. Jeffers; Roger M. Rickert

[57] ABSTRACT

An arrangement for fastening a capillary tube to a body of a thermometer wherein a clamping device of U-shaped construction is provided having an aperture for receiving the capillary tube, the leg portions of the U-shaped clamp being provided at their free ends with projections adapted to be received in an opening in the thermometer body to secure the capillary tube to the thermometer body, and a layer of elastic material disposed within the clamp to provide a friction surface against the thermometer tube.

4 Claims, 5 Drawing Figures

U.S. Patent April 6, 1976 3,948,101
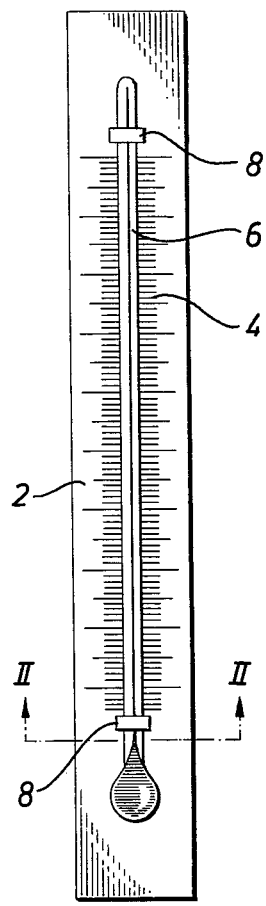
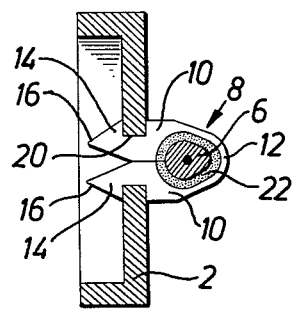
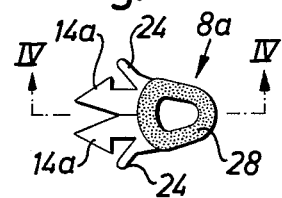
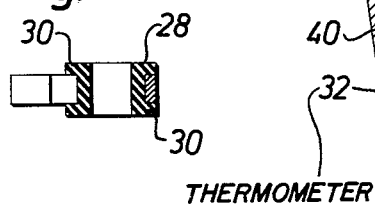
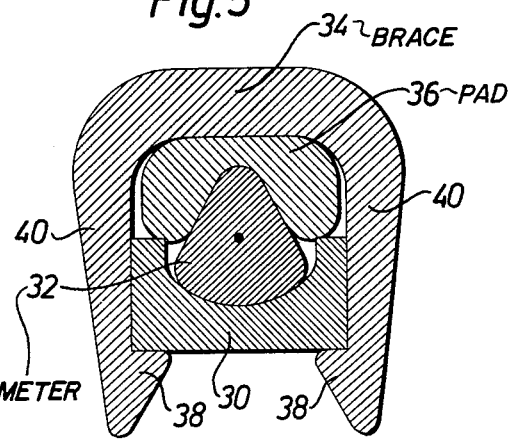

3,948,101

BRACE ARRANGEMENT FOR A THERMOMETER

BACKGROUND OF THE INVENTION

1. Field of the Invention

The present invention relates to an arrangement for fastening a capillary tube to a body of a thermometer.

In thermometers of the kind comprising a capillary tube which contains a liquid which dependent on the temperature takes a higher or a lower level the capillary tube is fastened to a body of the thermometer which is provided with the thermometer scale.

2. Description of the Prior Art

Many different arrangements for providing this fastening of the tube to the body are previously known. One of these arrangements comprises the use of narrow metal strips which enclose the tube and have their ends fixed to the body. However, these metal strips do not prevent a longitudinal displacement of the tube in relation to the body and therefore it is also necessary to provide the body with an aperture which is engaged by a projection formed on the capillary tube. This engagement between body and tube makes it impossible, or at least difficult, to adjust the position of the tube in relation to the body and the thermometer scale once the aperture has been formed in the body and this is a substantial drawback in said fastening arrangement. There are fastening arrangements previously known which allow an adjustment of the capillary tube in relation to the thermometer body and the scale thereof but these arrangements are not reliable in the respect of maintaining the adjusted position for example if the thermometer is dropped.

SUMMARY OF THE INVENTION

Therefore, the object of the present invention is to provide a simple arrangement in a thermometer for fastening a capillary tube to a thermometer body which arrangement in a reliable way retains the capillary tube to the body and although allows an adjustment of the tube in relation thereto.

In order to comply with this object the arrangement according to the invention comprises at least one clamping device which comprises portions engaging the thermometer body and preferably releasably retains the clamping device thereto and further comprises a friction surface engaging the capillary tube and by means of friction retaining the tube to the clamping device and thereby to the thermometer body.

In a preferred embodiment the clamping device of the arrangement comprises a substantially U-shaped brace preferably consisting of plastic and forming an aperture for receiving the capillary tube, the leg portions of the U-shaped brace being provided at their free ends with projections and having their free ends at a distance from each other to be resiliently pressable against each other for allowing that the end portions of the leg portions provided with the projections are introduced into openings in the thermometer body and thereupon spring out for retaining the brace to the body by engaging the other side of the body.

In the preferred embodiment of the arrangement according to the invention a layer of elastic material, for example rubber, is provided in the aperture of the brace for receiving the tube, said elastic material constituting said friction surface and being pressed against the thermometer tube by means of the U-shaped brace. By means of the elastic material there is provided a resilient suspension of the capillary tube so that damages to the capillary tube and division of the liquid column therein are obviated.

Because of the fact that the capillary tube is fixed to the thermometer body by means of friction it is possible to adjust the position of the tube in relation to the body by temporarily decreasing the engagement between the friction surface and the tube.

The invention is described in the following with reference to the enclosed drawings.

BRIEF DESCRIPTION OF THE DRAWINGS

FIG. 1 shows a plan view of a thermometer provided with the arrangement according to the invention;

FIG. 2 is a section along line 2—2 in FIG. 1 and shows an embodiment of the brace included in the arrangement according to the invention;

FIG. 3 shows a modified embodiment of a brace included in the arrangement according to the invention;

FIG. 4 is a section along line 4—4 in FIG. 3; and

FIG. 5 is a section corresponding to FIG. 2 of a further embodiment of an arrangement according to the invention.

DESCRIPTION OF THE PREFERRED EMBODIMENTS

In FIG. 1 there is shown a thermometer the main portions of which are constituted by a thermometer body 2 which is provided with a scale 4 and supports a capillary tube 6 containing a liquid, for example alcohol, the volume changes of the liquid dependent on the temperature of the surroundings being read against the scale 4. The capillary tube 6 is fixed to the body 2 by means of clamping devices in the form of braces 8.

FIG. 2 is a section showing the design of the braces 8. Each brace 8 is substantially U-shaped and comprises two leg portions 10 connected with each other by means of a web portion 12. Preferably the braces consist of plastic of such a quality that the leg portions can be separated for allowing that the capillary tube 6 is introduced between the leg portions into an aperture formed at the portion of the brace adjacent the web portion 12 thereof. At its central portion the leg portions 10 have portions adapted to engage each other and in the engagement position clamp around the capillary tube for indisplaceably retaining the tube by means of friction. From the central portion in the direction of their free ends the leg portions 10 extend from each other in such a way that the free ends are resiliently movable against each other. The free end portions of the leg portions are provided at their surfaces turned from each other with projections 14. The projections have chamfered surfaces 16 providing that the free end portions of the leg portions are resiliently displaced against each other when the brace is pressed into a corresponding aperture 20 in the body so that the projections 14 can be pressed through the aperture 20 and after passing the aperture can snap out at the back surface of the body 2. As shown in the drawing the braces 8 can be provided with groove-like apertures inside the projections 14, in which the portions of the body surrounding said apertures, therein can be received. In order to make the suspension of the capillary tube resilient and thereby prevent damages thereto and prevent the liquid column from being divided if the thermometer is dropped and also to make the friction of the brace against the capillary tube 6 extra high a layer 22 of elastic material, for example rubber, can be provided around the aperture of the brace for receiving the capillary tube.

In FIG. 3 there is shown a modified embodiment of the brace included in the device according to the invention. The brace 8a is provided with a further pair of side projections 24 inside the projections 14a and the apertures for receiving the portions of the body surrounding the aperture therein, said pair of projections being adapted resiliently to engage the front side of the body 2 so that the brace 8a is fixed to the body also when the dimensions of the body deviate. According to FIGS. 3 and 4 the brace 8a has an annular element 28 of rubber or the like which directly engages the capillary tube and prevent displacement thereof by means of high friction. The annular element 28 is provided with flange portions 30 projecting outside the rest of the brace for providing that the annular element is securely retained in the brace.

FIG. 5 is a section of a modified embodiment of the arrangement according to the invention. The arrangement comprises a body plate 30 provided with the thermometer scale, a capillary tube 32, and a clamping device consisting of a brace 34 and a pad 36 of an elastic material, e.g. rubber. The pad 36 forms the friction surface of the arrangement and is pressed against the tube 32 by means of the brace 34. The clamping position of the brace 34 is maintained by projections 38 formed on the leg portions 40 of the brace 34 and engaging the back surface of the body plate 30.

In the embodiments shown in the drawings it is possible to adjust the position of the capillary tube in relation to the thermometer body and the scale thereon by temporarily releasing the brace for decreasing the friction of the friction surface against the tube and displace the tube whereupon the brace is returned to the clamping position thereof.

The invention can be modified within the scope of the following claims.

I claim:

1. A thermometer comprising a thermometer body plate, a capillary tube and at least one substantially U-shaped resilient brace having a separate inner element with a flexible friction surface engaging the capillary tube for retaining the tube in a spaced relationship with respect to the brace at one side thereof, said body plate having at least one aperture therethrough, and leg portions at the free ends of the U-shaped brace adapted to be received in the aperture, said leg portions be provided with lateral projections engaging the sides of the body plate thereof at which the tube is positioned for maintaining the tube in spaced relationship to the body plate, said leg portions further being resiliently pressable in a direction substantially parallel with the side of the body plate engaged by the lateral projections for disengaging said lateral projections from the engagement therewith in order to allow adjustment of the capillary tube in relation to the thermometer body plate in the longitudinal direction of said tube.

2. An arrangement as claimed in claim 1, in which said inner element is a layer of elastic material, for example rubber, that is provided in the aperture of the brace for receiving the tube, said elastic material constituting said friction surface and being pressed against the thermometer tube by means of the U-shaped brace.

3. A thermometer as set forth in claim 1 wherein an inner friction surface of the brace completely surrounds a portion of the capillary tube and is in pressure contact therewith.

4. A thermometer as set forth in claim 1 wherein the lateral projections extend oppositely to each other.

* * * * *